United States Patent Office 2,861,082
Patented Nov. 18, 1958

2,861,082

HYDROXYANILINOPHTHALIDES

Donald D. Wheeler and David C. Young, Midland, Mich., assignors to The Dow Chemical Company, Midland, Mich., a corporation of Delaware No Drawing. Application July 5, 1956
Serial No. 595,852

3 Claims. (Cl. 260—343.3)

This invention is directed to hydroxyanilinophthalides having the structure

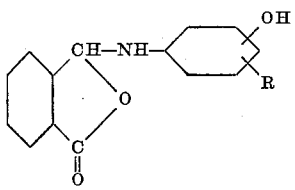

wherein R is a member of the group consisting of hydrogen and chlorine. The new compounds are light-colored solids somewhat soluble in organic solvents such as acetone and ethanol, and substantially insoluble in water. The compounds are useful in parasiticidal compositions to be employed for the control of bacteria, fungi and nematodes. These compounds also have properties valuable for their use as antioxidants.

The compounds of this invention are conveniently prepared by causing phthalaldehydic acid to react with a hydroxyaniline having the structure

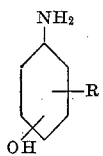

The terms "phthalaldehydic acid" and "3-hydroxyphthalide" refer to a compound having the formula

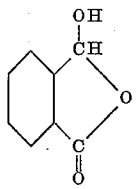

Phthalaldehydic acid is often represented in the literature as having the structure

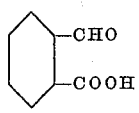

However, the acid employed in this invention and prepared as hereinafter described exists almost entirely in the 3-hydroxyphthalide ring structure, as indicated by its infrared absorption spectrum. Infrared data also indicate the hydroxyanilinophthalide products to have the same characteristic ring structures.

The reaction may be carried out in an inert solvent as reaction medium and takes place readily in the temperature range of from 20° to 150° C. with the formation of the desired phthalide products and water of reaction. Suitable solvents include acetone, benzene, butanone, water and alcohol. Good results are obtained when substantially equimolar proportions of the reactants are employed.

In carrying out the reaction, phthalaldehydic acid and the appropriate hydroxyaniline are dissolved in or mixed with the reaction solvent. Mixing of the reactants oftentimes results in the development of heat of reaction. The reaction mixture is then heated for a period of from a few minutes to several hours to obtain the desired hydroxyanilinophthalide product. The latter usually precipitates from the reaction mixture during the heating as a crystalline solid. The mixture is then cooled to precipitate further product and the latter recovered from the mixture by filtration. The phthalide product may be purified, if desired, by washing with or recrystallizing from a suitable solvent.

The following examples illustrate the invention but are not to be construed as limiting.

*Example 1.—3-(4-hydroxyanilino)phthalide*

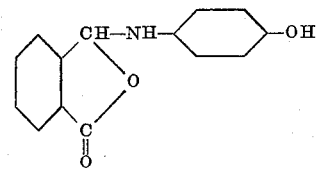

27.2 grams (0.25 mole) of p-aminophenol, 37.5 grams (0.25 mole) of phthalaldehydic acid and 300 milliliters of water were mixed together. A reaction took place with evolution of heat and the precipitation of a 3-(4-hydroxyanilino)phthalide product in the reaction mixture. The latter after repeated washing with water and drying at 50°–60° C. at 15 millimeters' pressure melted from 180° to 183° C. The yield of the product amounted to 46.5 grams or 93 percent of theoretical.

*Example 2.—3-(2-hydroxyanilino)phthalide*

A solution of 27.2 grams (0.25 mole) of o-aminophenol in 100 milliliters of acetone and 37.5 grams (0.25 mole) of phthalaldehydic acid in 100.0 milliliters of acetone are mixed together. The resulting mixture is warmed on the steam bath for a few minutes. Thereafter, the mixture is allowed to cool to precipitate the product as a solid. The latter is separated therefrom by filtration to obtain a 3-(2-hydroxyanilino)phthalide having a molecular weight of 241.

*Example 3.—3-(5-chloro-2-hydroxyanilino)phthalide*

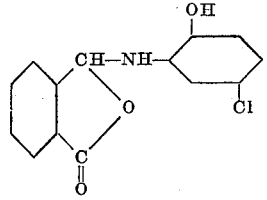

A warm solution of 15 grams (0.1 mole) of phthalaldehydic acid in 50 milliliters of acetone was mixed with a warm solution of 14.4 grams (0.1 mole) of 2-amino-4-chlorophenol in 25 milliliters of acetone. A reaction took place immediately with evolution of heat and the formation of the desired product. The mixture was cooled in an ice bath to precipitate the product. The latter was isolated by filtration and washed with acetone and dried to obtain a 3-(5-chloro-2-hydroxyanilino)-phthalide product melting at 204°–205° C. The yield of the product was 15 grams or 55 percent of theoretical.

In similar preparations the following hydroxyanilinophthalides are prepared:

3-(2-chloro-5-hydroxyanilino)phthalide having a molecular weight of 275.5 by the reaction of 3-amino-4-chlorophenol with phthalaldehydic acid.

3-(2-chloro-4-hydroxyanilino)phthalide having a molecular weight of 275.5 by the reaction of 4-amino-3-chlorophenol with phthalaldehydic acid.

The phthalides of the present invention are particularly useful as constituents of bacteriostatic and fungistatic preparations. In a representative operation, solid nutrient agar media saturated with 3-(4-hydroxyanilino)-phthalide gave complete inhibition of growth when streaked with *Staphylococcus aureus* and *Salmonella typhosa* and incubated at 30° C. for three days.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed in U. S. 2,748,162.

We claim:
1. A hydroxyanilinophthalide having the formula

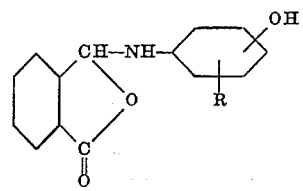

wherein R represents a member of the group consisting of hydrogen and chlorine.
2. 3-(4-hydroxyanilino)phthalide.
3. 3-(5-chloro-2-hydroxyanilino)phthalide.

References Cited in the file of this patent

Glogauer: Berichte Deut. Chem., 2d, pages 2036–2039 (1896).

Beilstein's Handbuch der Org. Chem., vol. 18, page 627 (1934).